United States Patent
Patrikalakis

(10) Patent No.: US 12,241,754 B2
(45) Date of Patent: Mar. 4, 2025

(54) SYSTEMS AND METHODS FOR MAP VERIFICATION

(71) Applicant: TOYOTA RESEARCH INSTITUTE, INC., Los Altos, CA (US)

(72) Inventor: Andrew Patrikalakis, Los Altos, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 16/985,181

(22) Filed: Aug. 4, 2020

(65) Prior Publication Data

US 2022/0042817 A1 Feb. 10, 2022

(51) Int. Cl.
  *G01C 21/36* (2006.01)
  *G01C 21/00* (2006.01)
  *G01C 21/30* (2006.01)

(52) U.S. Cl.
  CPC ......... *G01C 21/3638* (2013.01); *G01C 21/30* (2013.01); *G01C 21/3691* (2013.01); *G01C 21/3822* (2020.08); *G01C 21/3856* (2020.08)

(58) Field of Classification Search
  CPC .................. G01C 21/3638; G01C 21/30; G01C 21/3691; G06K 9/00; G06T 7/73;
  (Continued)

(56) References Cited

U.S. PATENT DOCUMENTS

| 7,161,604 B2 | 1/2007 | Higgins |
| 10,055,650 B2 | 8/2018 | Yi |

(Continued)

FOREIGN PATENT DOCUMENTS

| DE | 102016006193 | * | 5/2013 | ............. G02B 27/01 |
| KR | 20170139946 A | | 12/2017 | |

(Continued)

OTHER PUBLICATIONS

Kun, Andrew L. et al., "Automotive user interfaces and interactive applications in the car," Pers Ubiquit Comput 17, 801-802 (2013).

(Continued)

*Primary Examiner* — Jess Whittington
*Assistant Examiner* — Terry C Buse
(74) *Attorney, Agent, or Firm* — SHEPPARD, MULLIN, RICHTER & HAMPTON LLP; Daniel N. Yannuzzi

(57) ABSTRACT

Systems and methods are provided for verifying the accuracy of a map. Information regarding objects, such as roadway or roadway-related elements may be encoded into a map to be used for navigation and/or control of a vehicle, such as an autonomous vehicle. In order to verify that the map accurately reflects the roadway or roadway-related elements making up a section of roadway, the vehicle may be driven/ridden along the same section of roadway. A camera feed can be captured of this subsequent traversal of the section of roadway to check if the map includes the requisite roadway or roadway-related elements. The known roadway or roadway-related elements can be occluded from view in the camera feed. Accordingly, if any roadway or roadway-related elements do appear in the camera feed, they can be more easily detected by a verifier, and the processor verification is simplified.

19 Claims, 8 Drawing Sheets

(58) Field of Classification Search
CPC ... G06T 7/11; G06T 7/194; G06T 7/12; G06T 7/174; G06N 5/04; G06N 3/04; G09G 5/00; B60W 10/04; B60W 10/18; B60W 10/20; B60W 10/22; B60W 30/12
See application file for complete search history.

(56) References Cited

U.S. PATENT DOCUMENTS

| | | | |
|---|---|---|---|
| 10,496,273 | B2 | 12/2019 | Li |
| 11,537,819 | B1* | 12/2022 | Das .................. H04W 4/44 |
| 2007/0070090 | A1 | 3/2007 | Debettencourt |
| 2016/0096476 | A1* | 4/2016 | Fairchild ............... B60R 11/04 |
| | | | 348/148 |
| 2019/0228262 | A1* | 7/2019 | Gonzalez ............. A63F 13/65 |
| 2020/0019799 | A1 | 1/2020 | Shen |
| 2020/0057453 | A1* | 2/2020 | Laws .................. G05D 1/0088 |
| 2020/0086879 | A1* | 3/2020 | Lakshmi Narayanan ............ |
| | | | G06V 20/597 |
| 2020/0098135 | A1* | 3/2020 | Ganjineh ............ G06V 20/588 |
| 2021/0019910 | A1* | 1/2021 | Huyn ..................... G06T 7/75 |
| 2021/0039495 | A1* | 2/2021 | Kondo .................... B60K 35/00 |
| 2022/0080826 | A1* | 3/2022 | Shoji ..................... B60K 35/22 |
| 2022/0289239 | A1* | 9/2022 | Shenfeld ............ G01C 21/3833 |

FOREIGN PATENT DOCUMENTS

| | | | | |
|---|---|---|---|---|
| WO | | 2019079790 A1 | 4/2019 | |
| WO | WO-2019175686 A1 | * | 9/2019 | ......... G06K 9/00335 |

OTHER PUBLICATIONS

Stoven-Dubois, Alexis et al., "A Collaborative Framework for High-Definition Mapping," 2019 IEEE Intelligent Transportation Systems Conference (ITSC), Auckland, New Zealand, 2019, pp. 1845-1850.

* cited by examiner

SYSTEMS AND METHODS FOR MAP VERIFICATION

TECHNICAL FIELD

The present disclosure relates generally to autonomous driving, and in particular, some implementations may relate to verifying accuracy of an encoded map to be used during autonomous vehicle operation.

DESCRIPTION OF RELATED ART

Advanced driver-assistance systems (ADAS) can refer to electronic systems that assist a vehicle operator while driving, parking, or otherwise maneuvering a vehicle. ADAS can increase vehicle and road safety by minimizing human error, and introducing some level of automated vehicle/vehicle feature control. Autonomous driving systems may go further than ADAS by leaving responsibility of maneuvering and controlling a vehicle to the autonomous driving systems. For example, an autonomous driving system may comprise some package or combination of sensors to perceive a vehicle's surroundings, and advanced control systems that interpret the sensory information to identify appropriate navigation paths, obstacles, road signage, etc.

BRIEF SUMMARY OF THE DISCLOSURE

In accordance with one embodiment, a computer-implemented method, comprises presenting a traveling scene regarding a section of roadway being traversed by a vehicle, and determining known roadway objects in the traveling scene based on a previously generated map. The computer-implemented method may further comprise occluding the known roadway objects in the traveling scene upon subsequent traversal of the section of roadway. Moreover, the computer-implemented method may comprise receiving input regarding visible roadway objects in the traveling scene during the subsequent traversal of the section of roadway to verify accuracy of the previously generated map.

In some embodiments, the presentation of the traveling scene is performed in real-time during a map verification process.

In some embodiments, the presentation of the traveling scene is performed during an off-line map verification process.

In some embodiments, the determination of the known roadway objects comprises comparing a current location of the vehicle to a commensurate location represented by the previously generated map. In some embodiments, the determination of the known roadway objects further comprises identifying roadway objects encoded in the previously generated map at the current location of the vehicle. In some embodiments, the presentation of the traveling scene comprises presenting a camera feed of the traveling scene captured by a camera of the vehicle. In some embodiments, the occluding of the known roadway objects comprises annotating the camera feed with occluding visual elements overlaid on at least one of a location and a position of each of the known roadway objects as each of the known roadway objects appear in the camera feed.

In some embodiments, the computer-implemented method may further comprise prompting a verifier viewing the traveling scene to indicate appearance of one or more roadway objects therein to elicit the received input.

In some embodiments, a vehicle may comprise a processor, and a memory unit operatively connected to the processor and including computer code, that when executed, causes the processor to: present a traveling scene regarding a section of roadway being traversed by a vehicle; determine known roadway objects in the traveling scene based on a previously generated map; occlude the known roadway objects in the traveling scene upon subsequent traversal of the section of roadway; and receive input regarding visible roadway objects in the traveling scene during the subsequent traversal of the section of roadway to verify accuracy of the previously generated map.

In some embodiments, the computer code, that when executed, may cause the processor to present the traveling scene in real-time during a map verification process.

In some embodiments, the computer code, that when executed, may cause the processor to present the traveling scene during an off-line map verification process.

In some embodiments, the computer code, that when executed causes the processor to determine the known roadway objects further comprises computer code, that when executed, further causes the processor to compare a current location of the vehicle to a commensurate location represented by the previously generated map.

In some embodiments, the computer code, that when executed, causes the processor to determine the known roadway objects further comprises computer code, that when executed, further causes the processor to identify roadway objects encoded in the previously generated map at the current location of the vehicle.

In some embodiments, the computer code, that when executed, causes the processor to present the traveling scene comprises computer code, that when executed, further causes the processor to present a camera feed of the traveling scene captured by a camera of the vehicle.

In some embodiments, the computer code, that when executed, causes the processor to occlude the known roadway objects, comprises computer code, that when executed, further causes the processor to comprises annotating the camera feed with occluding visual elements overlaid on at least one of a location and a position of each of the known roadway objects as each of the known roadway objects appear in the camera feed.

In some embodiments, the memory unit includes further computer code, that when executed, further causes the processor to prompt a verifier viewing the traveling scene to indicate appearance of one or more roadway objects therein to elicit the received input.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
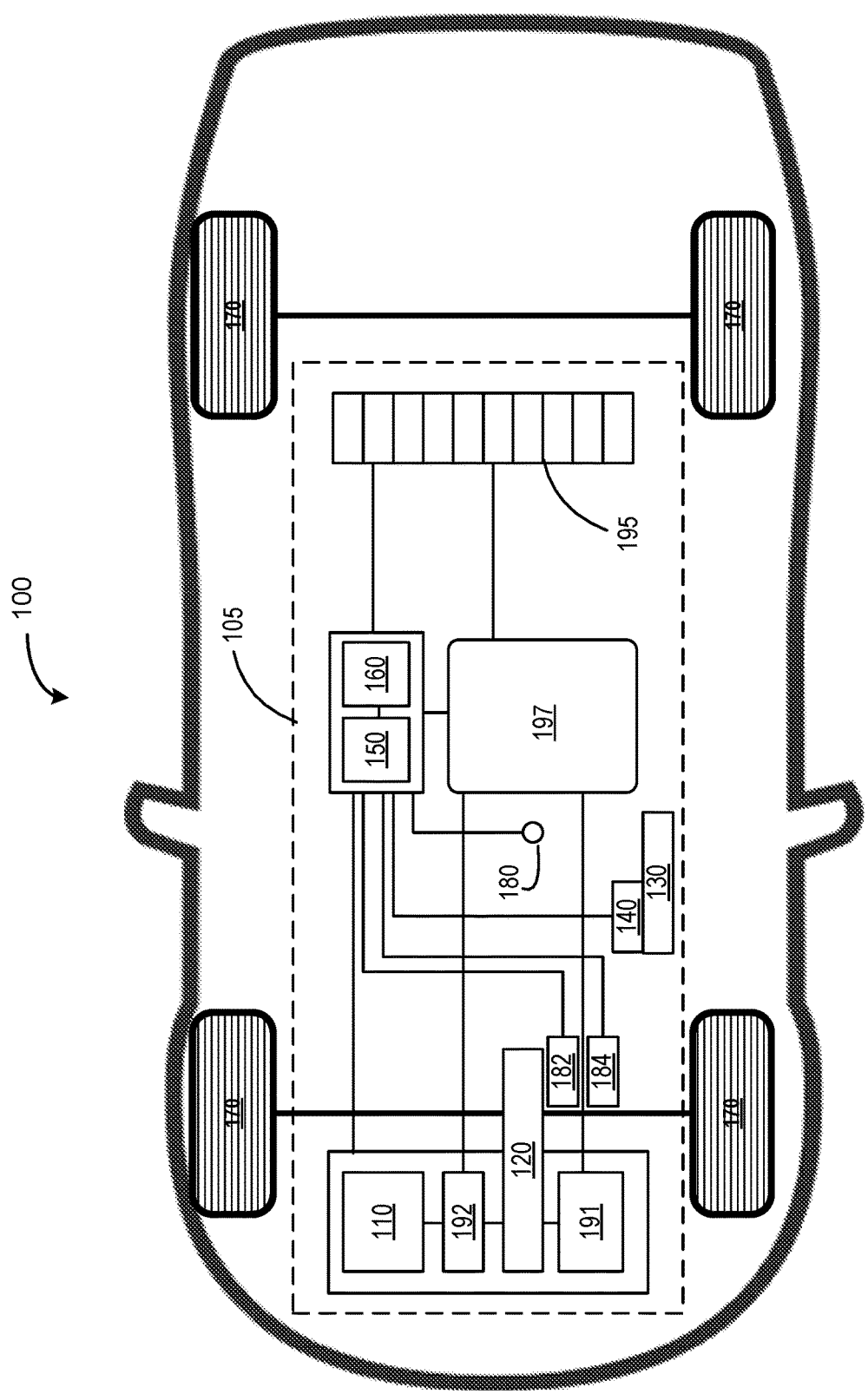
FIG. 1 is a schematic representation of an example vehicle with which embodiments of the systems and methods disclosed herein may be implemented.

The figures are not exhaustive and do not limit the present disclosure to the precise form disclosed.

DETAILED DESCRIPTION

As alluded to above, ADAS and autonomous driving control systems can be used in vehicles that at least, in part, controls or manages vehicle operation to provide varying levels of automated control or assistance. For ease of reference, the term "autonomous control" will be used herein to refer to such systems. In some vehicles, an override mechanism, such as an override switch, may be used to turn off or disengage a vehicle's autonomous control system.

Autonomous control systems typically generate control signals/instructions for operating a vehicle based on high definition (HD) maps that denote the exact (or as exact as possible) position/location of roadway or road-related elements/objects. These roadway or road-related elements/objects can include, but are not limited to the position of lane lines, three-dimensional (3D) positions of traffic control devices, e.g., traffic signals or lights, traffic signs, painted roadway instructions, etc. Regardless of how HD maps may be generated (some methods are described in greater detail below), the resolution or accuracy of such HD maps is paramount. Any errors in such HD maps typically go unnoticed until, e.g., a verifier such as human passenger or automated detection verification component in an autonomous vehicle detects that some aspect of an HD map is inaccurate. For example, the verifier may notice that the HD map is missing a traffic signal at a particular intersection. However, error detection can be difficult depending on the particular environment. For example, object density in a particular area may be high, where a large number of objects such as pedestrians, buildings, multiple traffic control devices, etc. can make it difficult to verify that all traffic control devices in that area are properly reflected in the HD map.

Accordingly, various embodiments are directed to systems and methods of improved map verification. In some embodiments, a camera feed captured by an autonomous vehicle traversing a route(s) specified in an HD map can be altered in a way that occludes roadway elements or objects whose presence and/or location/position is obtained from the HD map. Thus, when a verifier is viewing the camera feed captured by the autonomous vehicle (either in real-time or at a later time), the verifier can more easily detect when the HD map (or more particularly the information encoded in or as the HD map) is incorrect. For example, if the HD map represents an intersection as having a single traffic signal, when in actuality, the intersection has two traffic signals, the altered camera feed may present a view where the single traffic signal (encoded in the HD map) is blocked out, e.g., with a red box or other visual element, or removed from view. The verifier will therefore detect the existence of the second traffic signal as it will be visible in the altered camera feed, and more easily so because the first traffic signal will not be visible. A user interface or other input mechanism can be provided so that the verifier can enter a note, set a flag, or enter some indication that a roadway element (in this case, a traffic signal) is visible and should be included in the HD map. The user interface can be interactive, and may prompt the verifier with questions asking if the verifier sees any roadway elements, to which the verifier may respond via the user interface/other input mechanism.

It should be noted that the systems and methods described herein can be adapted for use in alternative scenarios, where, e.g., an HD map incorrectly denotes/represents the existence of some road element(s) or object(s). For example, in open areas/spaces, a verifier may notice a blocked out element against, e.g., some section of roadway or some portion of a scene that should not include a road element or object, such as against a natural feature neighboring a road.

The systems and methods disclosed herein may be implemented with or by any of a number of different vehicles and vehicle types. For example, the systems and methods disclosed herein may be used with automobiles, trucks, motorcycles, recreational vehicles, farm vehicles, and other like on-or off-road vehicles. In addition, the principles disclosed herein may also extend to other vehicle types as well. An example hybrid electric vehicle is illustrated and described below as one example.

FIG. 1 illustrates an example hybrid electric vehicle (HEV) 100 in which various embodiments for driver disengagement of autonomous vehicle/driving controls may be implemented. It should be understood that various embodiments disclosed herein may be applicable to/used in various vehicles (internal combustion engine (ICE) vehicles, fully electric vehicles (EVs), etc.) that are fully or partially autonomously controlled/operated, not only HEVs.

HEV 100 can include drive force unit 105 and wheels 170. Drive force unit 105 may include an engine 110, motor generators (MGs) 191 and 192, a battery 195, an inverter 197, a brake pedal 130, a brake pedal sensor 140, a transmission 120, a memory 160, an electronic control unit (ECU) 150, a shifter 180, a speed sensor 182, and an accelerometer 184.

Engine 110 primarily drives the wheels 170. Engine 110 can be an ICE that combusts fuel, such as gasoline, ethanol, diesel, biofuel, or other types of fuels which are suitable for combustion. The torque output by engine 110 is received by the transmission 120. MGs 191 and 192 can also output torque to the transmission 120. Engine 110 and MGs 191 and 192 may be coupled through a planetary gear (not shown in FIG. 1B). The transmission 120 delivers an applied torque to the wheels 170. The torque output by engine 110 does not directly translate into the applied torque to the wheels 170.

MGs 191 and 192 can serve as motors which output torque in a drive mode, and can serve as generators to recharge the battery 195 in a regeneration mode. The electric power delivered from or to MGs 191 and 192 passes through inverter 197 to battery 195. Brake pedal sensor 140 can detect pressure applied to brake pedal 130, which may further affect the applied torque to wheels 170. Speed sensor 182 is connected to an output shaft of transmission 120 to detect a speed input which is converted into a vehicle speed by ECU 150. Accelerometer 184 is connected to the body of HEV 100 to detect the actual deceleration of HEV 100, which corresponds to a deceleration torque.

Transmission 120 is a transmission suitable for an HEV. For example, transmission 120 can be an electronically controlled continuously variable transmission (ECVT), which is coupled to engine 110 as well as to MGs 191 and 192. Transmission 120 can deliver torque output from a combination of engine 110 and MGs 191 and 192. The ECU 150 controls the transmission 120, utilizing data stored in memory 160 to determine the applied torque delivered to the wheels 170. For example, ECU 150 may determine that at a certain vehicle speed, engine 110 should provide a fraction of the applied torque to the wheels while MG 191 provides most of the applied torque. ECU 150 and transmission 120 can control an engine speed ($N_E$) of engine 110 independently of the vehicle speed (V).

ECU 150 may include circuitry to control the above aspects of vehicle operation. ECU 150 may include, for example, a microcomputer that includes a one or more processing units (e.g., microprocessors), memory storage (e.g., RAM, ROM, etc.), and I/O devices. ECU 150 may execute instructions stored in memory to control one or more electrical systems or subsystems in the vehicle. ECU 150 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

MGs 191 and 192 each may be a permanent magnet type synchronous motor including for example, a rotor with a permanent magnet embedded therein. MGs 191 and 192 may each be driven by an inverter controlled by a control signal from ECU 150 so as to convert direct current (DC) power from battery 195 to alternating current (AC) power, and supply the AC power to MGs 191, 192. MG 192 may be driven by electric power generated by motor generator MG 191. It should be understood that in embodiments where MG 191 and MG 192 are DC motors, no inverter is required. The inverter, in conjunction with a converter assembly may also accept power from one or more of MGs 191, 192 (e.g., during engine charging), convert this power from AC back to DC, and use this power to charge battery 195 (hence the name, motor generator). ECU 150 may control the inverter, adjust driving current supplied to MG 192, and adjust the current received from MG 191 during regenerative coasting and braking.

Battery 195 may be implemented as one or more batteries or other power storage devices including, for example, lead-acid batteries, lithium ion, and nickel batteries, capacitive storage devices, and so on. Battery 195 may also be charged by one or more of MGs 191, 192, such as, for example, by regenerative braking or by coasting during which one or more of MGs 191, 192 operates as generator. Alternatively (or additionally, battery 195 can be charged by MG 191, for example, when HEV 100 is in idle (not moving/not in drive). Further still, battery 195 may be charged by a battery charger (not shown) that receives energy from engine 110. The battery charger may be switched or otherwise controlled to engage/disengage it with battery 195. For example, an alternator or generator may be coupled directly or indirectly to a drive shaft of engine 110 to generate an electrical current as a result of the operation of engine 110. Still other embodiments contemplate the use of one or more additional motor generators to power the rear wheels of a vehicle (e.g., in vehicles equipped with 4-Wheel Drive), or using two rear motor generators, each powering a rear wheel.

Battery 195 may also be used to power other electrical or electronic systems in the vehicle. Battery 195 can include, for example, one or more batteries, capacitive storage units, or other storage reservoirs suitable for storing electrical energy that can be used to power MG 191 and/or MG 192. When battery 195 is implemented using one or more batteries, the batteries can include, for example, nickel metal hydride batteries, lithium ion batteries, lead acid batteries, nickel cadmium batteries, lithium ion polymer batteries, and other types of batteries.

Figure 2:
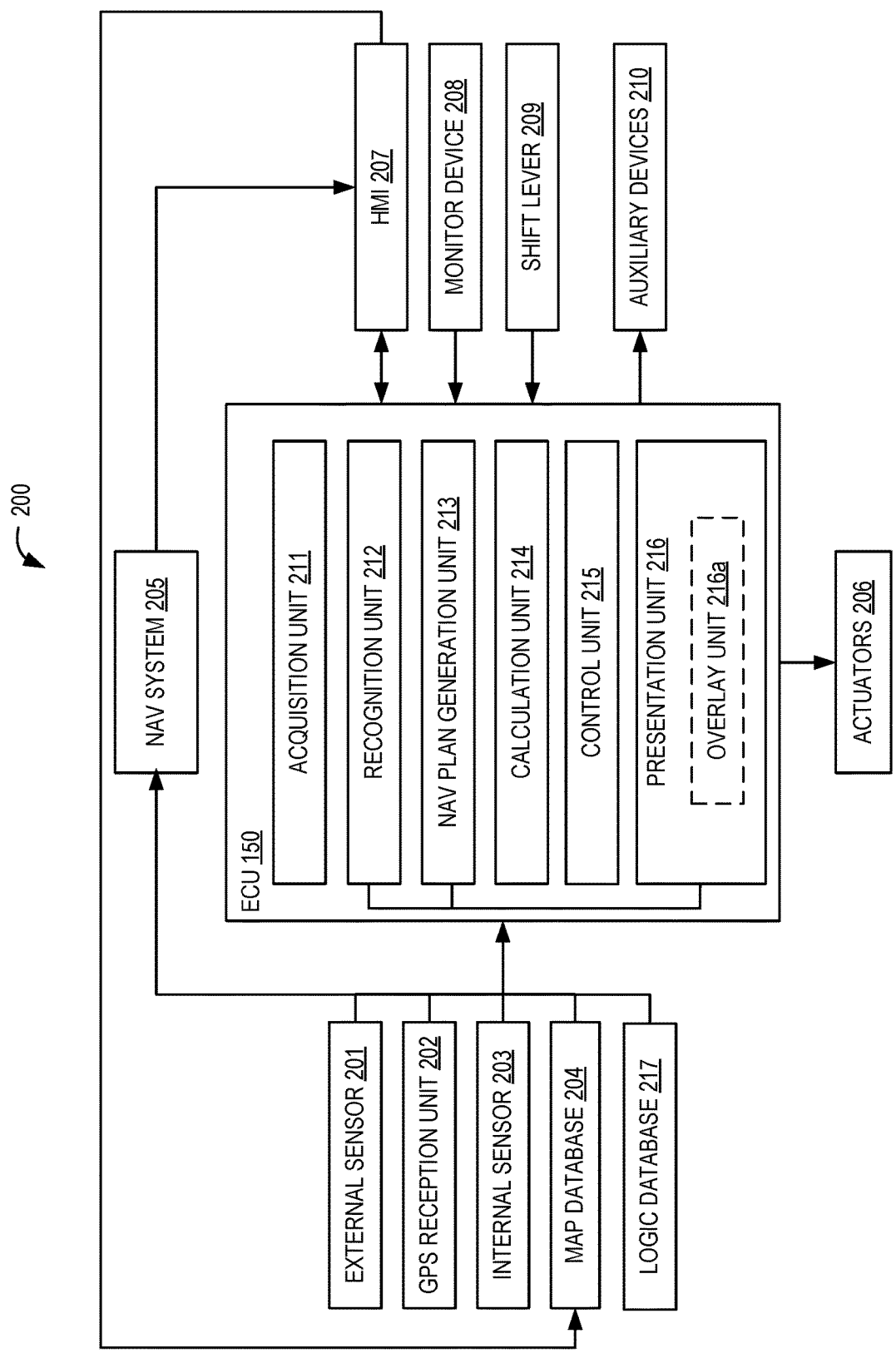
FIG. 2 illustrates an example autonomous control system including map verification in accordance with some embodiments.

FIG. 2 illustrates an example autonomous control system 200 that may be used to autonomously control a vehicle, e.g., HEV 100. Autonomous control system 200 may be installed in HEV 100, and executes autonomous control of HEV 100. As described herein, autonomous control can refer to control that executes driving/assistive driving operations such as acceleration, deceleration, and/or steering of a vehicle, generally movement of the vehicle, without depending or relying on driving operations/directions by a driver or operator of the vehicle.

As an example, autonomous control may include a lane keeping assist control where a steering wheel (not shown) is steered automatically (namely, without depending on a steering operation by the driver) such that HEV 100 does not depart from a running lane. That is, the steering wheel is automatically operated/controlled such that HEV 100 runs along the running lane, even when the driver does not perform any steering operation.

As another example, autonomous control may include navigation control, where when there is no preceding vehicle in front of the HEV 100, constant speed (cruise) control is effectuated to make HEV 100 run at a predetermined constant speed. When there is a preceding vehicle in front of HEV 100, follow-up control is effectuated to adjust HEV 100's speed according to a distance between HEV 100 and the preceding vehicle.

It should be understood that manual control or manual driving can refer to a vehicle operating status wherein a vehicle's operation is based mainly on driver-controlled operations/maneuvers. In an ADAS context, driving operation support control can be performed during manual driving. For example, a driver may be actively performing any of a steering operation, an acceleration operation, and a brake operation of the vehicle, while autonomous control apparatus 200 performs some subset of one or more of those operations, e.g., in an assistive, complementary, or corrective manner. As another example, driving operation support control adds or subtracts an operation amount to or from the operation amount of the manual driving (steering, acceleration, or deceleration) that is performed by the driver.

In the example shown in FIG. 2, autonomous control system 200 is provided with an external sensor 201, a GPS (Global Positioning System) reception unit 202, an internal sensor 203, a map database 204, a navigation system 205, actuators 206, an HMI (Human Machine Interface) 207, a monitor device 208, a shift lever 209, auxiliary devices 210. Autonomous control system 200 may communicate with ECU 150, or in some embodiments (may be implemented with its own ECU).

In the example shown in FIG. 2, external sensor 201 is a detector that detects external circumstances such as surrounding information of HEV 100. The external sensor 201 may include at least one of a camera, a radar, and a Laser Imaging Detection and Ranging (LIDAR) unit.

The camera unit may be an imaging device that images the external circumstances surrounding the vehicle. For example, the camera is provided on a back side of a front windshield of the vehicle. The camera may be a monocular camera or a stereo camera. The camera outputs, to the ECU 150, image information on the external circumstances surrounding the vehicle. The camera is not limited to a visible light wavelength camera but can be an infrared camera.

The radar unit uses radio waves to detect obstacles outside of the vehicle by transmitting radio waves to the surroundings of the vehicle, and receiving reflected radio waves from an obstacle to detect the obstacle, distance to the obstacle or a relative positional direction of the obstacle. The radar unit outputs detected obstacle information to the ECU 150.

The LIDAR unit may operate similar to the manner in which the radar unit operates except that light is used in place of radio waves. The LIDAR unit outputs detected obstacle information to the ECU 150.

In the example shown in FIG. 2, GPS reception unit 202 receives signals from three or more GPS satellites to obtain position information indicating a position of HEV 100. For example, the position information can include latitude information and longitude information. The GPS reception unit 202 outputs the measured position information of the vehicle to the ECU 150.

In the example shown in FIG. 2, the internal sensor 203 is a detector for detecting information regarding, e.g., a running status of HEV 100, operational/operating conditions, e.g., amount of steering wheel actuation, rotation, angle, amount of acceleration, accelerator pedal depression, brake operation by the driver of HEV 100. The internal sensor 203 includes at least one of a vehicle speed sensor, an acceleration sensor, and a yaw rate sensor. Moreover, internal sensor 203 may include at least one of a steering sensor, an accelerator pedal sensor, and a brake pedal sensor.

A vehicle speed sensor is a detector that detects a speed of the HEV 100. In some embodiments, HEV 100's speed may be measured directly or through calculations/inference depending on the operating conditions/status of one or more other components of HEV 100. For example, a wheel speed sensor can be used as the vehicle speed sensor to detect a rotational speed of the wheel, which can be outputted to ECU 150.

The acceleration sensor can be a detector that detects an acceleration of the vehicle. For example, the acceleration sensor may include a longitudinal acceleration sensor for detecting a longitudinal acceleration of HEV 100, and a lateral acceleration sensor for detecting a lateral acceleration of HEV 100. The acceleration sensor outputs, to the ECU 150, acceleration information.

The yaw rate sensor can be a detector that detects a yaw rate (rotation angular velocity) around a vertical axis passing through the center of gravity of HEV 100. For example, a gyroscopic sensor is used as the yaw rate sensor. The yaw rate sensor outputs, to the ECU 150, yaw rate information including the yaw rate of HEV 100.

The steering sensor may be a detector that detects an amount of a steering operation/actuation with respect to a steering wheel 30 by the driver of HEV 100. The steering operation amount detected by the steering sensor may be a steering angle of the steering wheel or a steering torque applied to the steering wheel, for example. The steering sensor outputs, to the ECU 150, information including the steering angle of the steering wheel or the steering torque applied to the steering wheel of HEV 100.

The accelerator pedal sensor may be a detector that detects a stroke amount of an accelerator pedal, for example, a pedal position of the accelerator pedal with respect to a reference position. The reference position may be a fixed position or a variable position depending on a determined parameter. The accelerator pedal sensor is provided to a shaft portion of the accelerator pedal AP of the vehicle, for example. The accelerator pedal sensor outputs, to the ECU 150, operation information reflecting the stroke amount of the accelerator pedal.

The brake pedal sensor may be a detector that detects a stroke amount of a brake pedal, for example, a pedal position of the brake pedal with respect to a reference position. Like the accelerator position, a brake pedal reference position may be a fixed position or a variable position depending on a determined parameter. The brake pedal sensor may detect an operation force of the brake pedal (e.g. force on the brake pedal, oil pressure of a master cylinder, and so on). The brake pedal sensor outputs, to the ECU 150, operation information reflecting the stroke amount or the operation force of the brake pedal.

A map database 204 may be a database including map information. The map database 204 is implemented, for example, in a disk drive or other memory installed in HEV 100. The map information may include road position information, road shape information, intersection position information, and fork position information, for example. The road shape information may include information regarding a road type such as a curve and a straight line, and a curvature angle of the curve information on road widths (information on lane widths), information on road slopes, information on the cant angle of a road, and information on the maximum vehicle speed on a road. The map information may also include position information on intersections and branching points, position information on stop lines, position information on pedestrian crossings, and position information on traffic lights or any other traffic signs/elements or other roadway/external environmental elements. In addition, the map information may include position information on white lines (the position information may be stored, not as a line, but as a sequence of points), information on white-line types, information on the positions and the shapes of non-moving obstacles such as curbs, telephone poles, poles, guardrails, walls, and buildings, and information on the positions and the shapes of road surface markings such as symbols and marks painted on a road surface. When autonomous control system 200 uses a Simultaneous Localization and Mapping (SLAM) technology or position information of blocking structural objects such as buildings and walls, the map information may further include an output signal from external sensor 201. In some embodiments, map database 204 may be a remote data base or repository with which HEV 100 communicates.

As alluded to above, HD maps may be used for autonomous control of vehicle, such as HEV 100. Thus, map database 204 may comprise HD map information that can exhibit high precision, e.g., at the centimeter level, since autonomous control of HEV 100 should be precise and without error. The aforementioned external sensors 201, for example, may be used to detect/sense roadway objects for inclusion in an HD map of a particular portion of roadway. In some embodiments, an HD map can be manually generated (or at least partially so). A human user may review log data and captured video from a camera feed of HEV 100 while HEV 100 traverses that portion of roadway. Using a map editor, the human user may insert or annotate the HD map with all detected roadway elements that belong in the HD map, such as traffic control devices, persistent obstacles, such as island partitions, buildings, but not necessarily transient objects, e.g., pedestrians or other vehicles that may have been detected and reflected in the log and captured in the camera feed. In some embodiments, HD maps may be automatically generated. An example HD map generation system is described in US Patent Application 2020/0096359 (assigned to the present application), and is incorporated herein by reference in its entirety.

In some embodiments, an HD map may comprise various layers, and can include some or more layers including, e.g., a real-time layer, a map priors layer, a semantic map layer, a geometric map layer, and a base map layer. The base map layer may comprise a standard definition map. The geometric map layer may comprise raw sensor data collected by sensors, e.g., external sensor 201, GPS reception unit 202, and/or internal sensor 203. The geometric map layer may output a dense 3D point cloud, which can be post-processed to produce derived map objects that are stored in the geometric map.

The semantic map can build upon the geometric map layer through the addition of semantic objects, e.g., 2D or 3D objects, such as lane boundaries, intersections, parking spots, stop signs, traffic lights, etc. that are used for driving safely, especially in the autonomous driving context. These 2D/2D objects can contain rich information such as traffic speeds, lane change restrictions etc. On the other hand, the map priors layer may comprise dynamic information and human behavior data, e.g., an order according to which a traffic signal may change colors, average speeds of vehicles at parking spots, etc. Autonomy algorithms commonly consume these priors in models as inputs or features and combined with other real-time information. The real-time layer can be dynamically updated, and may include information, such as real-time traffic information.

A logic database 217 may be a database that stores a plurality of position detection processing logics (position detection logics) used for detecting the position of HEV 100. Position detection processing can refer to processing for detecting vehicle position based on the detection result of external sensor 201 (images captured by the camera, results detected by the radar sensor/LIDAR sensor, etc.). The position detection processing is stored in association with traveling scenes or camera feeds of/captured by HEV 100. In addition, logic database 217 may store camera-captured images each associated with the map information (latitude, longitude) stored in map database 204.

Navigation system 205 may be a component or series of interoperating components that guides a user, e.g., driver or passenger, of HEV 100 to a destination on a map designated by the user of HEV 100. For example, navigation system 205 may calculate a route followed or to be followed by HEV 100, based on the position information of HEV 100 measured by GPS reception unit 202 and map information of map database 204. The route may indicate a running lane of a section(s) of roadway in which HEV 100 traverses, for example. Navigation system 205 calculates a target route from the current position of HEV 100 to the destination, and notifies the driver of the target route through a display, e.g., a display of a head unit, HMI 207 (described below), and/or via audio through a speaker(s) for example. The navigation system 205 outputs, to the ECU 150, information of the target route for HEV 100. In some embodiments, navigation system 205 may use information stored in a remote database, like map database 204, and/or some information processing center with which HEV 100 can communicate. A part of the processing executed by the navigation system 205 may be executed remotely as well.

Actuators 206 may be devices that execute running controls of HEV 100. The actuators 206 may include, for example, a throttle actuator, a brake actuator, and a steering actuator. For example, the throttle actuator controls, in accordance with a control signal output from the ECU 150, an amount by which to open the throttle of HEV 100 to control a driving force (the engine) of HEV 100. In another example, actuators 206 may include one or more of MGs 191 and 192, where a control signal is supplied from the ECU 150 to MGs 191 and/or 192 to output motive force/energy. The brake actuator controls, in accordance with a control signal output from the ECU 150, the amount of braking force to be applied to each wheel of the vehicle, for example, by a hydraulic brake system. The steering actuator controls, in accordance with a control signal output from the ECU 150, driving an assist motor of an electric power steering system that controls steering torque.

HMI 207 may be an interface used for communicating information between a passenger(s) (including the operator) of HEV 100 and autonomous control system 200. For example, the HMI 207 may include a display panel for displaying image information for the passenger(s), a speaker for outputting audio information, and operation buttons or a touch panel used by the occupant for performing an input operation. HMI 207 may also or alternatively transmit the information to the passenger(s) through a mobile information terminal connected wirelessly and receive the input operation by the passenger(s) through the mobile information terminal.

Monitor device 208 monitors a status of the driver/operator. The monitor device 208 can check a manual driving preparation state of the driver. More specifically, the monitor device 208 can check, for example, whether or not the driver is ready to start manual operation of HEV 100. Moreover, the monitor device 208 can check, for example, whether or not the driver has some intention of switching HEV 100 to a manual mode of operation.

For example, the monitor device 208 may be a camera that can take an image of the driver, where the image can be used for estimating the degree to which the driver's eyes are open, the direction of the driver's gaze, whether or not the driver is holding the steering wheel, etc. Monitor device 208 may also be a pressure sensor for detecting the amount of pressure the driver's hand(s) are applying to the steering wheel. As another example, the monitor device 208 can be a camera that takes an image of a hand of the driver.

A shift lever 209 can be positioned at a shift position, e.g., "A (AUTOMATIC)," "D (DRIVE)," etc. The shift position "A" indicates, for example, an automatic engage mode where autonomous control is engaged automatically. The shift position "D" indicates a triggered engage mode where autonomous control is engaged in response to a driver-initiated request to operate HEV 100 in an autonomous driving mode.

Auxiliary devices 210 may include devices that can be operated by the driver of the vehicle, but are not necessarily drive-related, such as actuators 206. For example, auxiliary devices 210 may include a direction indicator, a headlight, a windshield wiper and the like.

ECU 150 may execute autonomous control of the vehicle, and may include an acquisition unit 211, a recognition unit 212, a navigation plan generation unit 213, a calculation unit 214, a presentation unit 216, and a control unit 215.

Acquisition unit 211 may obtain the following operation amounts or levels of actuation based on the information obtained by the internal sensor 203: steering operation, acceleration operation, and brake operation by the driver during an autonomous control mode; and the level of steering operation, acceleration operation, and brake operation by the driver of the vehicle during a manual control mode.

Recognition unit 212 may recognize or assess the environment surrounding or neighboring HEV 100 based on the information obtained by the external sensor 201, the GPS reception unit 202, and/or the map database 204. For example, the recognition unit 212 includes an obstacle recognition unit (not shown), a road width recognition unit (not shown), and a facility recognition unit (not shown). The obstacle recognition unit recognizes, based on the information obtained by the external sensor 201, obstacles surrounding the vehicle. For example, the obstacles recognized by the obstacle recognition unit include moving objects such as pedestrians, other vehicles, motorcycles, and bicycles and stationary objects such as a road lane boundary (white line, yellow line), a curb, a guard rail, poles, a median strip, buildings and trees. The obstacle recognition unit obtains information regarding a distance between the obstacle and the vehicle, a position of the obstacle, a direction, a relative velocity, a relative acceleration of the obstacle with respect to the vehicle, and a category and attribution of the obstacle. The category of the obstacle includes a pedestrian, another vehicle, a moving object, and a stationary object. The attribution of the obstacle can refer to a property of the obstacle such as hardness and a shape of the obstacle.

The road width recognition unit recognizes, based on the information obtained by the external sensor 201, the GPS reception unit 202, and/or the map database 204, a road width of a road in which the vehicle is running.

The facility recognition unit recognizes, based on the map information obtained from the map database 204 and/or the vehicle position information obtained by the GPS reception unit 202, whether or not HEV 100 is operating/being driven through an intersection, in a parking structure, etc. The facility recognition unit may recognize, based on the map information and the vehicle position information, whether or not the vehicle is running in a school zone, near a childcare facility, near a school, or near a park, etc.

Navigation plan generation unit 213 may generate a navigation plan for HEV 100 based on the target route calculated by the navigation system 205, the information on obstacles surrounding HEV 100 recognized by recognition unit 212, and/or the map information obtained from map database 204. The navigation plan may be reflected in one or more operating conditions/controls to effectuate the target route. For example, the navigation plan can include a target speed, a target acceleration, a target deceleration, a target direction, and/or a target steering angle with which HEV 100 should be operated at any point(s) along the target route so that the target route can be achieved to reach a desired destination. It should be understood that navigation plan generation unit 213 generates the navigation plan such that HEV 100 operates along the target route while satisfying one or more criteria and/or constraints, including, for example, safety constraints, legal compliance rules, operating (fuel/energy) efficiency, and the like. Moreover, based on the existence of obstacles surrounding HEV 100, the navigation plan generation unit 213 generates the navigation plan for the vehicle so as to avoid contact with such obstacles, comport with roadway instructions (speed limit, turn-only lanes, traffic control devices, etc.).

Calculation unit 214 may calculate a threshold used for determining whether or not to switch from autonomous control to manual driving or vice versa. The determination can be performed based on the operating levels associated with the manner in which the driver is operating HEV 100 during autonomous control which is obtained by the acquisition unit 211. For example, the driver of HEV 100 may suddenly grasp the steering wheel (which can be sensed by internal sensor 203) and stomp on the brake pedal (which can be sensed by monitor device 208). The pressure on the steering wheel and the level of actuation of the brake pedal may be excessive enough (exceed a threshold) suggesting that the driver intends to override the autonomous control system 200.

Control unit 215 can autonomously control HEV 100 based on the navigation plan generated by navigation plan generation unit 213. The control unit 215 outputs, to the actuators 206, control signals according to the navigation plan. That is, the control unit 215 controls actuators 206 based on the navigation plan, and thereby autonomous control of HEV 100 is executed/achieved. Moreover, certain levels of operation, e.g., steering wheel actuation, by the driver can be detected by the acquisition unit 211. When such level(s) equal or exceed the threshold calculated by the calculation unit 214 in a period during which autonomous control is being used to operate HEV 100, control unit 215 executes a switching from autonomous control to manual control.

Presentation unit 216 displays, on a display of the HMI 207, various information that may be related to autonomous control, manual control, etc., e.g., indications regarding whether HEV 100 is operating in autonomous mode or manual mode. As will be described in greater detail below, map verification can be facilitated through presenting and/or annotating a camera feed via presentation unit 216 and HMI 207.

In the context of map verification, navigation system 205 may calculate a route to be followed by HEV 100, the route following or being commensurate with a portion(s) of roadway(s) reflected in an HD map stored in map database 204. In this way, the presence and/or position/location of roadway or roadway-related elements or objects denoted or otherwise encoded into the HD map can be verified.

For example, the HD map may be a currently generated HD map reflecting the various characteristics of a portion(s) of roadway as understood to exist through information/data collected by one or more of external sensor 201, GPS reception unit 202, internal sensor 203, and/or information already maintained in map database 204. Accordingly, the HD map, in its semantic map layer, may include the location/positioning of roadway or roadway-related objects or elements, such as traffic control devices, signs, and the like.

To verify the accuracy of the HD map, HEV 100 may traverse the aforementioned route calculated by navigation system 205 (or otherwise specified to be traversed). While traversing the route, HEV 100 may use a camera (e.g., external sensor 201) to capture a traveling scene. That traveling scene or camera feed can be altered and presented to a verifier that may be riding in HEV 100. The altering of the traveling scene or camera feed may comprise occluding known roadway or roadway-related objects or elements encoded in the HD map or some subset thereof. For example, map verification may comprise verifying only certain roadway or roadway-related objects, such as traffic control devices.

For example an overlay unit 216a may overlay some visual element, e.g., a shape or other visual element, such as a red or opaquely-colored box, that occludes traffic control devices. In this way, the traffic control devices are not visible to the verifier while the verified is viewing the traveling scene or camera feed on the display of HMI 207. Because the verifier cannot see such traffic control devices, the verifier is not distracted by already known/assumed to be known aspects of the route being traversed. That is, the verifier need only focus on roadway or roadway-related objects that do appear, i.e., are not occluded from view. Accordingly, verifying the accuracy of the HD map can be as simple as inputting or flagging an instance when the verifier sees or senses a traffic control device in the traveling scene/camera feed being presented by presentation unit 216.

In some embodiments, a black box could be used (although one of ordinary skill in the art would understand that other alternatives could be used, e.g., an overlay image/shape derived from the road element/object being blocked out). For example, in the case of an open sky scene, it could be a sky pattern. In the case of an overlay that is automatically derived from what is being blacked out (i.e. in the open sky case, areas neighboring that area to be removed can, e.g., be determined to be solid blue in color, and then a commensurate shape and/or color could be used to invisibly erase the traffic road element(s)/object(s).

In some embodiments, tagging could, in a speed optimized form, start in the form of a clicker to actuate if a user sees any non-blacked-out road element, e.g., traffic control device, at all. This can be effectuated in real-time. Subsequently, using the gross estimate of error times in the first step, a second step could involve verifiers/labelers working frame-by-frame at the flagged times, and actually marking/otherwise identifying approximate positions within the frame. If this process is performed for two or more cameras at the same timestep, a 3D position becomes available from the triangulation of the drawn-in positions, which can then be handed off to, e.g., a conventional map authoring process to add to the HD map (which then could be fed back in to this described process from the beginning to refine errors. In some embodiments, an inspectors can be asked for partial traffic control device visibility instead of fully visible devices.

Overlay unit 216*a* may leverage the information known about the traffic control devices present in the HD map's semantic map layer (described above). Accordingly, overlay unit 216*a* may generate occluding visual elements based on the characteristics of the traffic control devices reflected in the semantic map layer. As noted above, the semantic map layer may comprise 2D/3D semantic objects that in this example, represent one or more traffic control devices, and the occluding visual elements can be generated to mask the physical characteristics (footprint, outline, shape) of the traffic control devices.

As the camera (external sensor 201) is capturing the traveling scene, overlay unit 216*a* may add the occluding visual elements to the camera feed reflecting the traveling scene. Various known mechanisms or future mechanisms of adding such occluding visual elements can be leveraged. In one embodiment, and as described above, logic database 217 may detect the position of HEV 100 as it is traversing the calculated route. Thus, a real-time comparison can be made based on the current location of HEV 100 regarding the HD map being verified and information recognized or assessed by recognition unit 212. That is, recognition unit 212 may provide information regarding recognized traffic control devices that can be compared to the semantic map layer information of the HD map regarding traffic control devices. When a match is found between the information from recognition unit 212 and the semantic map layer of the HD map, overlay unit 216*a* may be triggered by presentation unit 216 to insert an appropriate occluding visual element to obscure a traffic control device that is found in both the HD map, and recognized by the recognition unit 212.

In another embodiment, recognition unit 212 need not be involved during the map verification process. For example, overlay unit 216*a* may simply be triggered to insert occluding visual elements to cover traffic control devices from view based solely on the information from the semantic map layer of the HD map from map database 204. That is, logic database 217 can again be used to determine a current location of HEV 100, and used to "synchronize" the traveling scene (or location HEV 100 is currently traveling) to locations on the HD map, and ultimately to the traffic control devices encoded as being present in the HD map. Thus, presentation unit 216 can present the traveling scene or camera feed on the display of HMI 207 with the occluding visual elements. Again, the verifier may tag or otherwise input an indication that a traffic control device is missing from or mis-located on the HD map via HMI 207.

In yet another embodiment, the map verification process may be performed at a later time, e.g., non-real-time. That is, HEV 100 may traverse the calculated route, and the camera (external sensor 201) may be used to capture the traveling scene. The above-described methods of adding the occluding visual elements can be used while generating the camera feed. The altered camera feed may then be viewed off-line, at a later time, by the verifier. HMI 207 or a user interface of a map editor may be used by the verifier to input the aforementioned tags, flags, or other indications of traffic control devices missing from the HD map. Alternatively, the camera feed may be captured, and the alteration to the camera feed may also occur off-line after the camera feed is captured. For example, the camera feed may be input in a map editor which has been adapted to have the same/similar functionality as the units/components used to effectuate map verification in HEV 100. That is, the map editor may be adapted to compare the semantic map layer of an HD map to information from HEV 100's recognition unit 212 or the camera feed (directly).

Figure 3A:
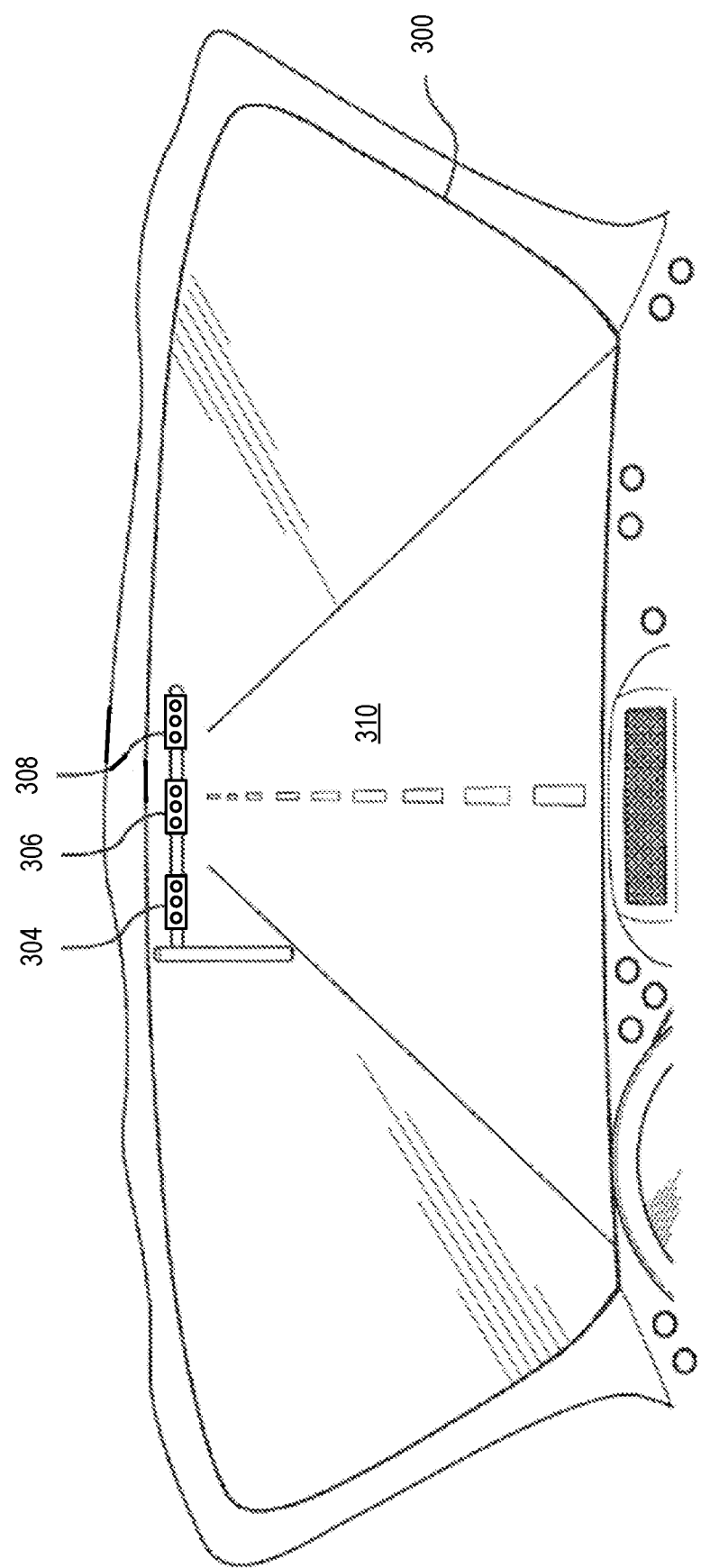
FIGS. 3A and 3B illustrate an example roadway feature/object detection and map verification scenario.

FIG. 3A illustrates an example scenario where a vehicle, such as HEV 100, is traversing a section of roadway. An example view 300 from the vehicle includes approaching traffic signals 304, 306, and 308 along a section of roadway 310. In this example scenario, recognition unit 212 may obtain information, e.g., from external sensor 201, that traffic signals 304, 306, and 308 are present at a particular location/position. This location/position may be reflected in the semantic map layer of an HD map stored in map database 204.

Figure 3B:
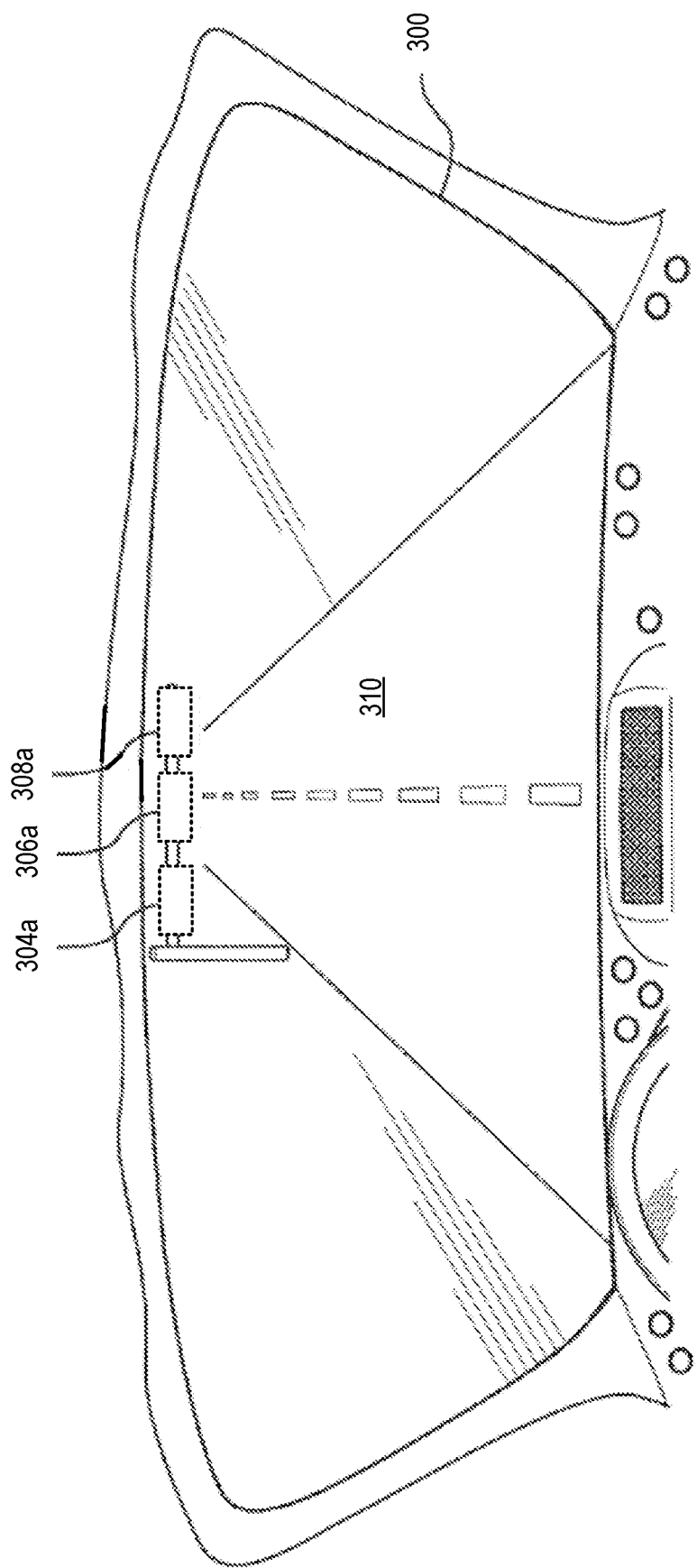

FIG. 3B illustrates an example map verification scenario where map verification is being performed in real-time by a verifier in HEV 100 as it again travels the same section of roadway 310. As noted above, navigation system 205 may calculate a route to be followed by HEV 100. Here, HEV 100 is once again approaching the location where traffic signals 304, 306, and 308 are present (and were previously recognized and incorporated as part of an HD map. Because traffic signals 304, 306, and 308 are already part of the HD map, overlay unit 216*a* may overlay traffic signals (presented by presentation unit 216 via a display of HMI 207) in the camera feed/traveling scene being taken by a camera of HEV 100 (e.g., external sensor 201). As noted above, the camera feed, during map verification, is altered to occlude known roadway or roadway-related elements, in this example, traffic signals 304, 306, and 308. Thus, the verifier instead of seeing traffic signals 304, 306, and 308 in the view 300, the verifier only sees, in this example, occluding visual elements 304*a*, 306*a*, and 308*a* in the form of colored boxes. In this way, and upon traversing this section of roadway 310, the verifier need not be distracted unnecessarily. It should be understood that the manner in which a roadway or roadway-related object is occluded can vary. In this example scenario, the traffic signals themselves are occluded from view with occluding visual elements 304*a*, 306*a*, and 308*a*, but in other embodiments, the occluding visual elements can occlude the entirety of a roadway or roadway-related object, e.g., the traffic signal post/pole, in addition to the traffic signal bulb enclosures. Again, because HD maps are so precise, overlay unit 216*a* can be configured to occlude or roadway or roadway-related objects in any manner desired.

As noted above, HMI 207 may prompt the verifier with questions regarding whether or not the verifier sees any roadway or roadway-related elements, in this case, traffic control devices. Here, the verifier can respond in the negative, or the verifier need not respond at all until a traffic control device appears (that has not been occluded, and thus suggests that the particular traffic control device was previously missed, went un-sensed, etc. In some embodiments, the location/position of a roadway or roadway-related object may not be precisely reflected in the HD map. Thus, overlay unit 216*a* may insert or annotate/append the camera feed with occluding visual elements that are shifted or off-the-mark. Again, the verifier, via HMI 207, may have the opportunity to input information or flag this error in the HD map.

Figure 3C:
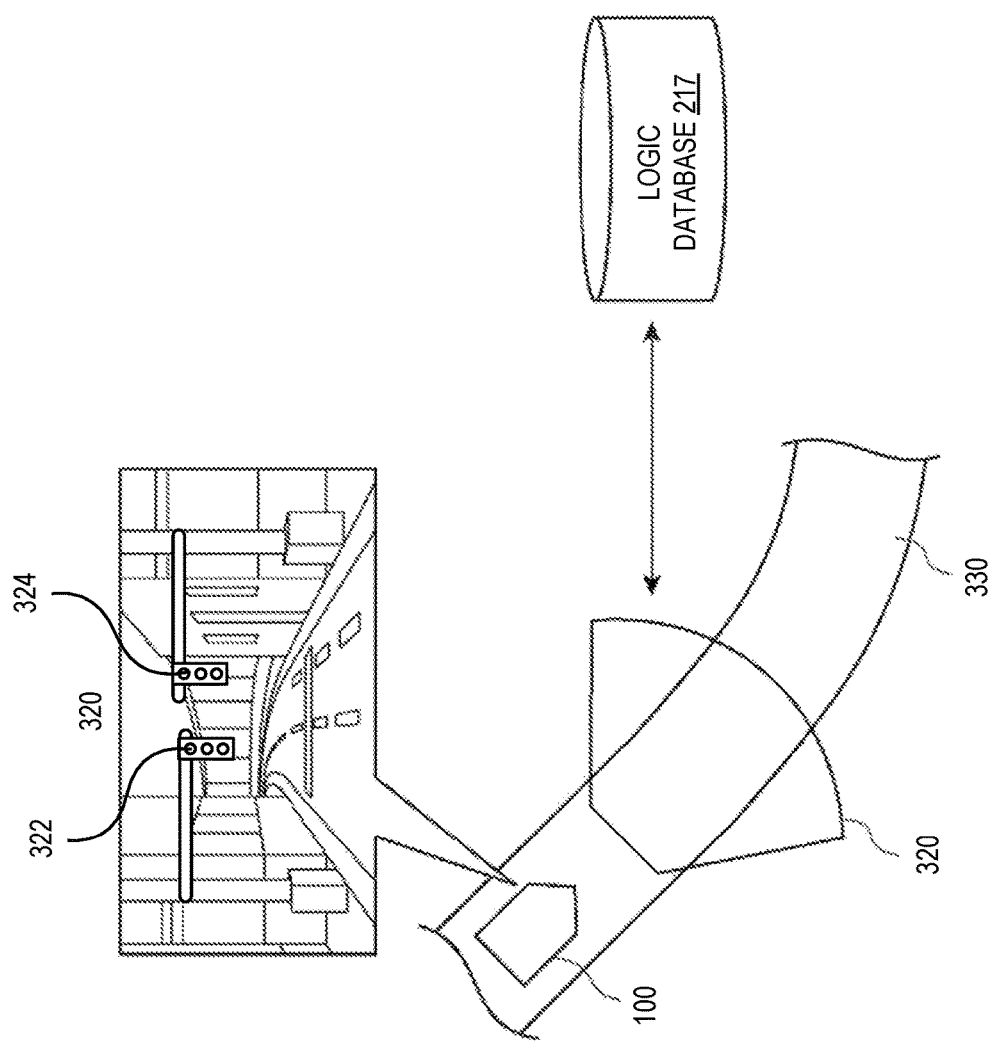
FIGS. 3C and 3D illustrate another example roadway feature/object detection and map verification scenario.
Figure 3D:
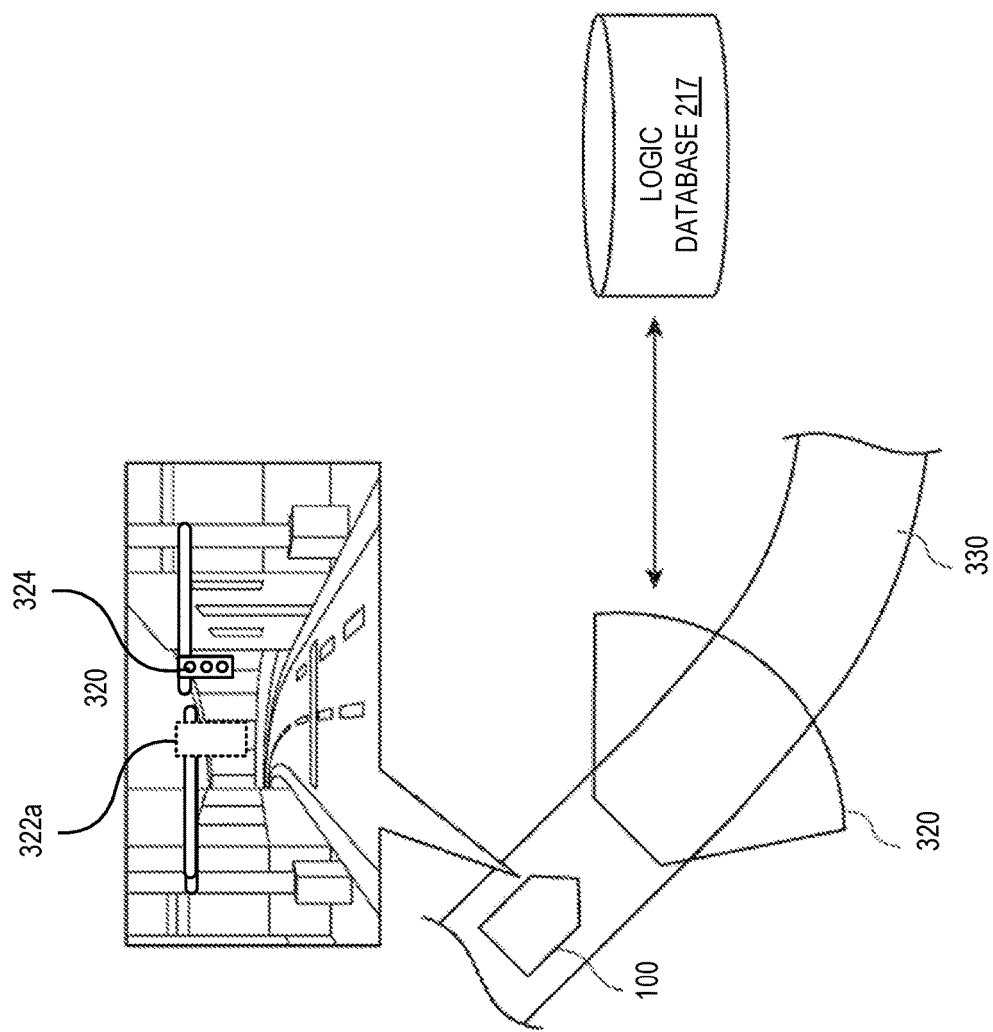

FIGS. 3C and 3D illustrate another example map verification scenario in accordance with some embodiments. As illustrated in FIG. 3C, a vehicle, such as HEV 100, is traversing a section of roadway 330. Logic database 217 provides location awareness regarding HEV 100. An example view 320 from HEV 100 includes approaching traffic signals 322 and 324 in an urban environment. In this example scenario, recognition unit 212 may obtain information, e.g., from external sensor 201, that traffic signals 322 and 324 are present at a particular location/position. This location/position may be reflected in the semantic map layer of an HD map stored in map database 204.

FIG. 3D illustrates an example map verification scenario where map verification is being performed in real-time by a verifier in HEV 100 as it again travels the same section of roadway 330. As noted above, navigation system 205 may calculate a route to be followed by HEV 100. Here, HEV 100 is once again approaching the location where traffic signals 322 and 324 are present. However, only traffic signal 322 was previously recognized and incorporated as part of an HD map. Because traffic signal 322 is already part of the HD map, overlay unit 216*a* may overlay traffic signals (presented by presentation unit 216 via a display of HMI 207) in the camera feed/traveling scene being taken by a camera of HEV 100 (e.g., external sensor 201). As noted above, the camera feed, during map verification, is altered to occlude known roadway or roadway-related elements, in this example, traffic signal 322. Unlike the previous example described above regarding FIGS. 3A and 3B, in this example, scenario, an error regarding traffic signal 324 occurred such that traffic signal has not been occluded from view. Because the verifier sees traffic signal 324 in the travel scene/camera feed, the verifier can indicate as such via HMI 207. In this way, the HD map can be corrected to include traffic signal 324 in its semantic map layer. It can be appreciated that in this example scenario, with the density of buildings and other roadway or roadway-related objects, map verification can be made more difficult without the occlusion of known roadway or roadway-related objects.

Figure 4:
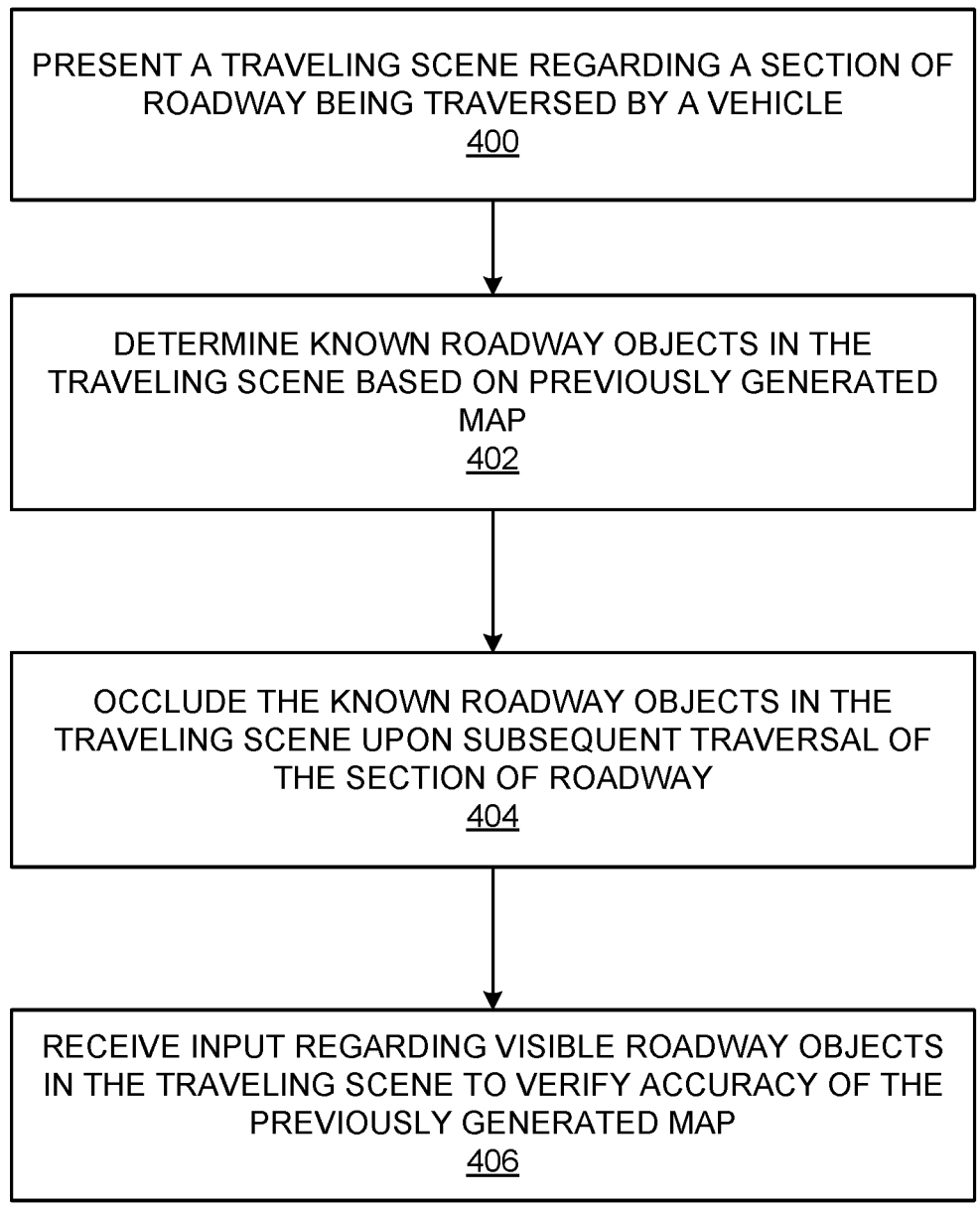
FIG. 4 is a flow chart illustrating example operations performed to verify a map in accordance with some embodiments.

FIG. 4 is a flow chart illustrating example operations that may be performed to verify the accuracy of a map or other similar collection of data regarding objects encoded or included in the map/collection of data. At operation 400, a traveling scene regarding a section of roadway being traversed by a vehicle may be presented. As discussed above, map verification may involve an autonomous vehicle repeatedly traversing sections of roadway based on previously generated maps to determine if the previously generated maps accurately reflect the sections of roadways in terms of roadway object inclusion. It should be understood that this presentation can occur in real-time as the vehicle is re-traversing the sections of roadway, or can occur off-line at a later time. For example, the vehicle may capture camera feeds of the sections of roadway to be later reviewed by a verification entity.

At operation 402, known roadway objects in the traveling scene are determined based on a previously generated map. As discussed above, maps, such as HD maps can be created manually or automatically, and involve encoding information regarding roadway objects to be represented therein. However, errors can occur, and certain roadway objects can be mis-located/mis-represented in the map in some way, or can be completely missing.

Determination of known roadway objects is performed so that, at operation 404, the known roadway objects in the traveling scene can be occluded upon the subsequent traversal of the section of roadway. That is, in order to ease the burden on a verification entity, such as human verifier viewing the traveling scene/camera feed of the traveling scene, the known roadway objects can be hidden or occluded from view. For example, occluding visual elements, such as boxes, outlines, or other shapes/mechanisms can be overlaid or otherwise used to cover/hide the known roadway objects.

At operation 406, input regarding visible roadway objects in the traveling scene are received to verify the accuracy of the previously generated map. As noted above, during operation 404, known roadway objects are occluded. Thus, any roadway objects that do happen to appear in the traveling scene/camera feed are assumed to be missing from the previously generated map. The verifier may input some indication of the existence of such missing or mis-located/mis-positioned roadway objects so that the map can be corrected.

Figure 5:
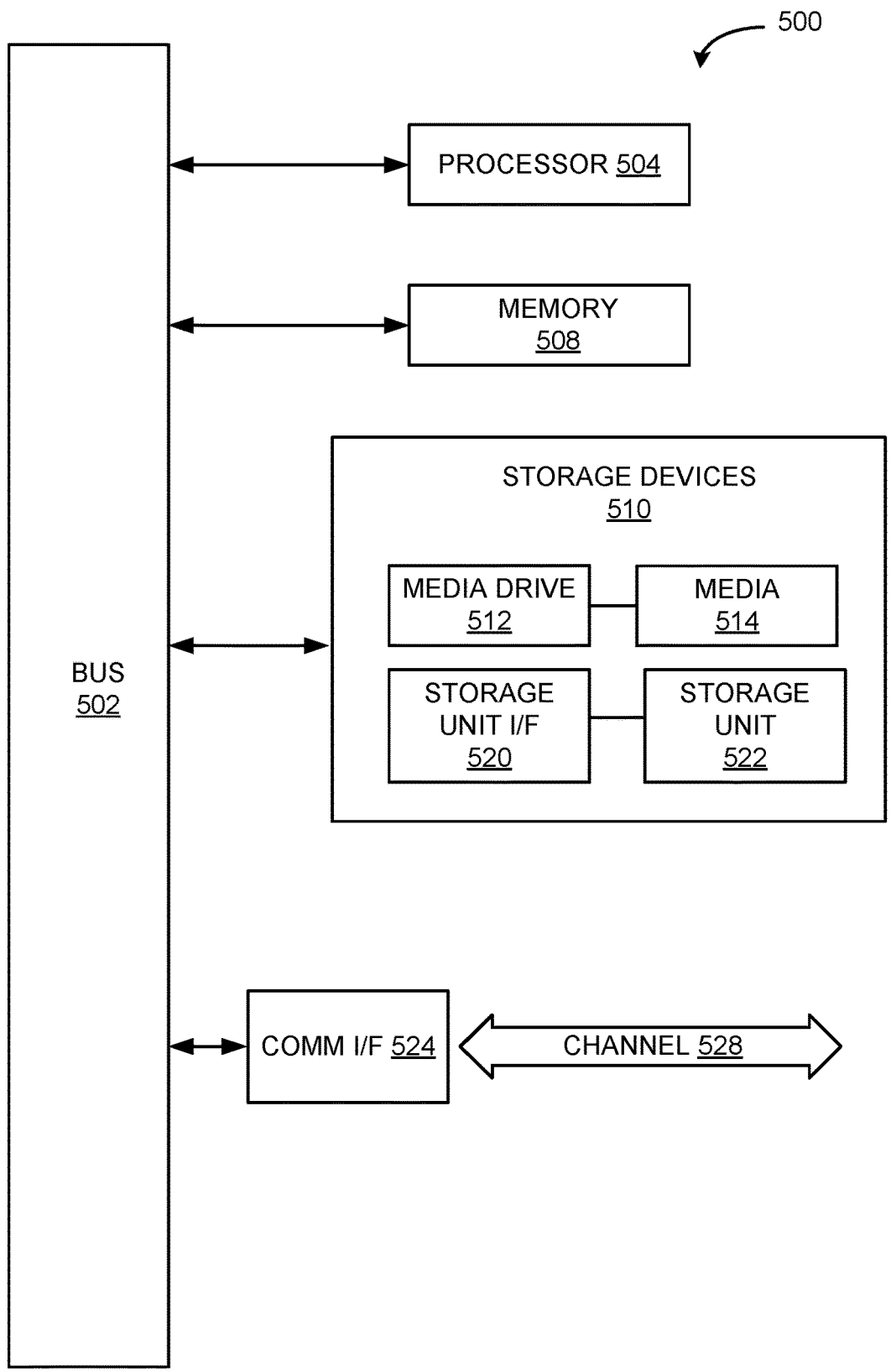
FIG. 5 is an example computing component that may be used to implement various features of embodiments described in the present disclosure.

It should be noted that although various embodiments described herein involve the use of maps, such as HD maps, the disclosed manner of verification can be applied in other contexts. For example, lists of objects or elements can be verified As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example—computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor 504. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
presenting to a user on a display a visual map of a traveling scene reflecting a section of roadway being traversed by a vehicle, wherein presenting the visual map comprises presenting first objects included in the presented visual map;
determining which of the first objects presented in the visual map are known stationary objects in the traveling scene based on a comparison of the first objects in the presented visual map with second objects in a previously generated map, the second objects comprising previously identified stationary objects, wherein determining which of the first objects presented in the visual map are the known stationary objects comprises:
identifying the first objects presented in the visual map;
determining a location of the vehicle;
retrieving the previously generated map of a same section of roadway being traversed by the vehicle based on the location of the vehicle, wherein the previously generated map is generated at time prior to the vehicle traversing the section of roadway;
comparing the identified first objects presented in the visual map with previously identified stationary objects in the previously generated map; and
labeling each of a plurality of first objects presented in the visual map as known stationary objects if they are instances of the previously identified stationary objects in the previously generated map;
occluding each of the known stationary objects in the presented visual map upon subsequent traversal of the same section of roadway, wherein occluding each of the known stationary objects comprises placing visual elements on the visual map at determined locations and/or positions corresponding to each of the known stationary objects to overlay each of the known stationary objects with the visual elements on at least one of a location and a position of each of the known stationary objects, based on a comparison of the presented visual map with the previously generated map; and
receiving input on the display regarding visible objects in the visual map, based on the occluding of the known stationary objects, during the subsequent traversal of the same section of roadway to verify accuracy of the previously generated map.

2. The computer-implemented method of claim 1, wherein the presentation of the visual map is performed in real-time during a map verification process.

3. The computer-implemented method of claim 1, wherein the presentation of the visual map is performed during an off-line map verification process.

4. The computer-implemented method of claim 1, wherein the determination of the known stationary objects comprises comparing the location of the vehicle to a commensurate location represented by the previously generated map.

5. The computer-implemented method of claim 4, wherein the determination of the known stationary objects further comprises identifying objects encoded in the previously generated map at the location of the vehicle.

6. The computer-implemented method of claim 5, wherein the presentation of the visual map comprises presenting a camera feed of the traveling scene captured by a camera of the vehicle.

7. The computer-implemented method of claim 6, wherein the occluding of the known stationary objects comprises annotating the camera feed with occluding visual elements overlaid on at least one of a location and a position of each of the known stationary objects as each of the known stationary objects appear in the camera feed.

8. The computer-implemented method of claim 1, further comprising prompting a verifier viewing the visual map to indicate appearance of one or more objects therein to elicit the received input.

9. The computer-implemented method of claim 8, wherein the verifier comprises one of an automated detection component in an autonomous vehicle, or a human passenger, to determine and confirm whether the generated visual map is accurate.

10. The computer-implemented method of claim 1, wherein the known stationary objects comprises a traffic signal.

11. The computer-implemented method of claim 1, wherein the received input tags a visible object as displayed in the visual map and missing from the previously generated map.

12. A vehicle, comprising:
a processor; and
a memory unit operatively connected to the processor and including computer code, that when executed, causes the processor to:
present to a user on a display a visual map of a traveling scene reflecting a section of roadway being traversed by a vehicle, wherein presenting the visual map comprises presenting first objects included in the presented visual map;
determine which of the first objects presented in the visual map are known stationary objects in the traveling scene based on a comparison of the first objects in the presented visual map with second objects in a previously generated map, the second objects comprising previously identified stationary objects, wherein the determination of which objects presented in the visual map are known stationary objects comprises:

identify the first objects presented in the visual map;
determine a location of the vehicle;
retrieve the previously generated map of a same section of roadway being traversed by the vehicle based on the location of the vehicle;
compare the identified first objects presented in the visual map with the previously identified stationary objects in the previously generated map; and
label each of a plurality of first objects presented in the visual map as known stationary objects if they are instances of the previously identified stationary objects in the previously generated map;
occlude each of the known stationary objects in the presented visual map upon subsequent traversal of the same section of roadway, wherein occluding each of the known stationary objects comprises annotating the presented visual map by placing visual elements on the visual map at determined locations and/or positions corresponding to each of the known stationary objects to overlay each of the known stationary objects with the visual elements on at least one of a location and a position of each of the known stationary objects, based on a comparison of the presented visual map with the previously generated map; and
receive input on the display regarding visible objects in the visual map during the subsequent traversal of the same section of roadway to verify accuracy of the previously generated map.

13. The vehicle of claim 12, wherein the computer code, that when executed, causes the processor to present the visual map in real-time during a map verification process.

14. The vehicle of claim 12, wherein the computer code, that when executed, causes the processor to present the visual map during an off-line map verification process.

15. The vehicle of claim 12, wherein the computer code, that when executed, causes the processor to determine the known stationary objects further comprises computer code, that when executed, further causes the processor to compare a current location of the vehicle to a commensurate location represented by the previously generated map.

16. The vehicle of claim 15, wherein the computer code, that when executed, causes the processor to determine the known stationary objects further comprises computer code, that when executed, further causes the processor to identify objects encoded in the previously generated map at the current location of the vehicle.

17. The vehicle of claim 16, wherein the computer code, that when executed, causes the processor to present the visual map comprises computer code, that when executed, further causes the processor to present a camera feed of the traveling scene captured by a camera of the vehicle.

18. The vehicle of claim 17, wherein the computer code, that when executed, causes the processor to occlude the known stationary objects, comprises computer code, that when executed, further causes the processor to annotate the camera feed with occluding visual elements overlaid on at least one of a location and a position of each of the known stationary objects as each of the known stationary objects appear in the camera feed.

19. The vehicle of claim 12, wherein the memory unit includes further computer code, that when executed, further causes the processor to prompt a verifier viewing the visual map to indicate appearance of one or more objects therein to elicit the received input.

* * * * *